(12) United States Patent
Vidal et al.

(10) Patent No.: US 8,662,259 B2
(45) Date of Patent: Mar. 4, 2014

(54) FORCE-MULTIPLIER BRAKE

(75) Inventors: Stéphane Vidal, Longueil Sainte Marie (FR); Nicolas Chaudot, Franklin, WI (US)

(73) Assignee: Poclain Hydraulics Industrie, Verberie (FR)

( * ) Notice: Subject to any disclaimer, the term of this patent is extended or adjusted under 35 U.S.C. 154(b) by 183 days.

(21) Appl. No.: 13/086,340

(22) Filed: Apr. 13, 2011

(65) Prior Publication Data

US 2011/0253488 A1    Oct. 20, 2011

(30) Foreign Application Priority Data

Apr. 19, 2010    (FR) ...................................... 10 52945

(51) Int. Cl.
*F16D 55/36*    (2006.01)
*F16D 65/22*    (2006.01)

(52) U.S. Cl.
USPC ......... 188/71.5; 188/72.3; 188/72.4; 188/170

(58) Field of Classification Search
USPC .............. 188/71.5, 72.1, 72.3, 72.4, 166, 170
See application file for complete search history.

(56) References Cited

U.S. PATENT DOCUMENTS

| 3,519,247 | A | | 7/1970 | Christisou | |
|---|---|---|---|---|---|
| 4,491,202 | A | * | 1/1985 | Schmitt | 188/170 |
| 4,645,039 | A | * | 2/1987 | Lewis et al. | 188/170 |
| 4,667,527 | A | * | 5/1987 | Ehrlinger et al. | 188/170 |
| 4,947,966 | A | * | 8/1990 | Huff | 188/170 |
| 5,186,284 | A | * | 2/1993 | Lamela et al. | 188/170 |
| 6,357,558 | B1 | * | 3/2002 | Case et al. | 188/170 |

FOREIGN PATENT DOCUMENTS

| FR | 1600966 | | 9/1970 |
|---|---|---|---|
| FR | 2467586 | A1 | 2/1981 |
| FR | 2761431 | A1 | 10/1998 |
| GB | 211746 | | 10/1983 |
| GB | 2123502 | A * | 2/1984 |

* cited by examiner

*Primary Examiner* — Thomas J Williams
(74) *Attorney, Agent, or Firm* — Blakely Sokoloff Taylor & Zafman

(57) ABSTRACT

A braking device including a housing mounted in relative rotation relative to a shaft, braking discs, a braking piston adapted to stress the braking discs, a spring washer mounted on the brake housing on a support zone located on one of the peripheries of its first face, and having on its second face a braking support zone, which cooperate with the braking piston so as to stress the braking discs according to a braking direction. An unbraking piston is adapted to stress the washer according to a direction opposite said braking direction. The spring washer has an unbraking support zone with the unbraking piston on the other of the peripheries of the second face of the spring washer. The braking support zone is located at an intermediate position of the at least one spring washer.

9 Claims, 7 Drawing Sheets

FORCE-MULTIPLIER BRAKE

GENERAL TECHNICAL FIELD

The invention relates to braking devices for engines, and applies particularly to braking devices for hydraulic engines with radial pistons.

PRIOR ART

Figure 1:
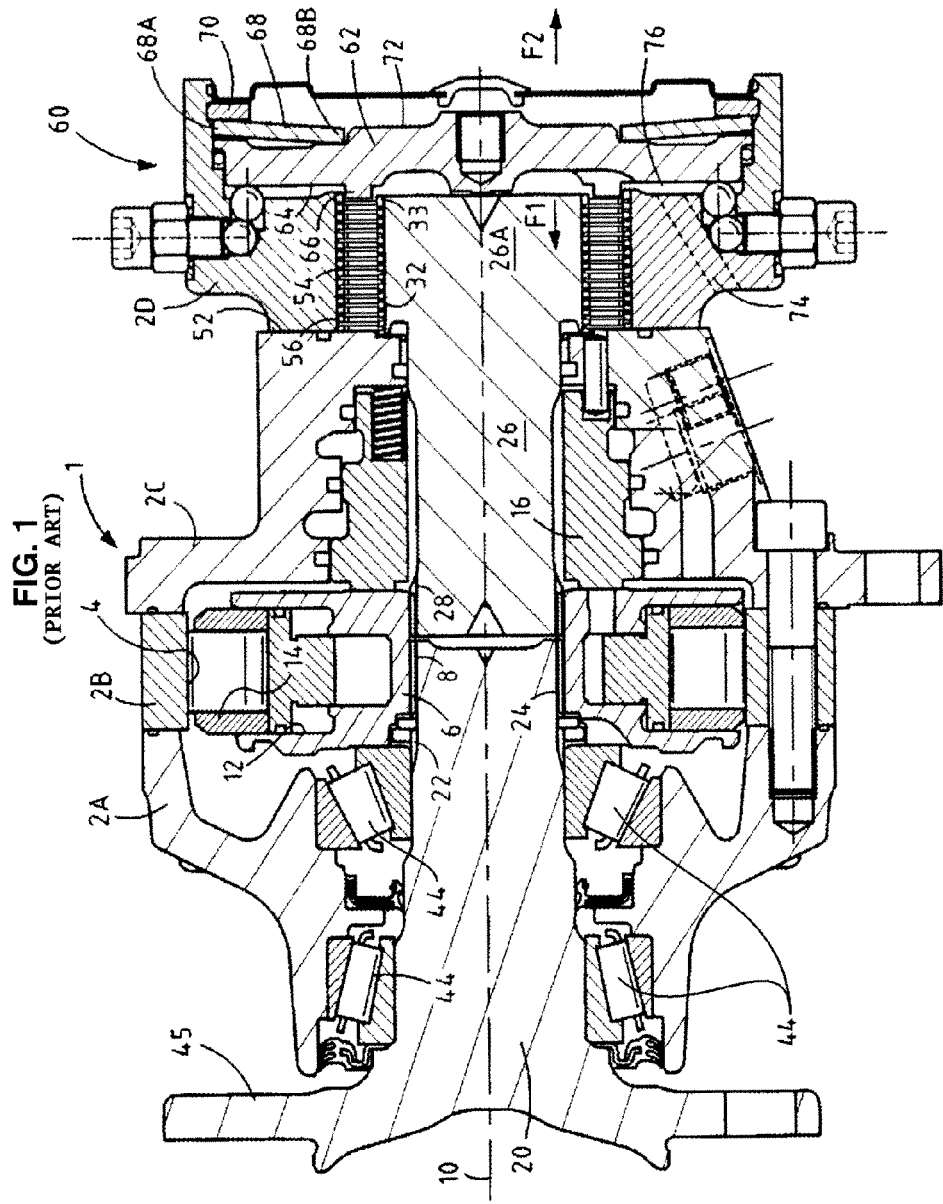

FIG. 1 shows a hydraulic engine 1 fitted with a braking device such as presented in document FR 2761431, comprising:
- a fixed housing in several parts 2A, 2B, 2C and 2D,
- a rippling reaction cam 4, arranged on the internal periphery of the part 2B of the housing;
- a cylinder block 6 which is mounted in relative rotation about an axis of rotation 10 relative to the cam 4, this cylinder block comprising a plurality of radial cylinders 12 capable of being fed with pressurised fluid, inside which are mounted piston sliders 14;
- an internal fluid distributor 16, attached to the housing vis-à-vis rotation about the axis 10 and comprising conduits of distribution capable of communicating with the cylinders 12;
- a shaft 20 which extends inside the housing coaxially to the axis of rotation 10 and is joined to the cylinder block by means of axial grooves 22 made in the periphery of the shaft and complementary grooves 24 made in the borehole 8 of the cylinder block; and
- a brake shaft 26, also joined to with the cylinder block by means of grooves 28 arranged on its external periphery and which cooperate with the grooves 24 of the borehole of the cylinder block, this shaft 26 passing through a borehole of the distributor 16 and comprising an extension 26A which is located beyond the distributor and which bears brake disc plates 32.

The engine 1 comprises a braking device 60 which comprises a brake housing 2D.

The brake shaft 26, by its extension 26A, which in fact projects beyond the axial end 52 of the part 2C of the housing opposite the cylinder block 6, extends inside the brake housing 2D. This extension 26A constitutes the element internal to the abovementioned brake housing.

The shaft 20 is mounted to rotate relative to the housing 2A, 2B, 2C and 2D, about the axis of rotation 10, by means of a roller bearing here comprising roller bearings 44 arranged according to O mounting, so as to spread apart the centres of rotation of the bearings. The free end of this shaft located outside the housing 2A, 2B, 2C and 2D comprises a coupling plate joining it to an element which must be driven in rotation by the engine.

The device 60 comprises a first series of annular plates of brake 54, more commonly known as brake discs, which are attached to the brake housing 2D.

For this purpose, on their external radial ends the plates exhibit indentations of form complementary to the form of grooves 56 made on a central borehole of the brake housing 2D.

The abovementioned brake disc plates 32 are as such solid in rotation with the brake shaft 26, their internal radial ends for this purpose having indentations of form complementary to the form of axial grooves 33 made on the periphery of the extension 26A of the brake shaft. The plates 54 are interleafed between the plates 32 and reciprocally, so as to produce alternating between the plates 54 and the plates 32.

The device 60 also comprises a braking piston 62 whereof the face 64 which is directed towards the distributor and the cylinder block has a support zone 66 whereof the axial end extends substantially transversally relative to the axis 10, opposite the stack of plates 32 and 54.

A spring washer 68, typically a Belleville washer, is mounted as a stop according to its external periphery 68A on a stop ring 70 linked to the housing 2D. This spring washer 68 is also in contact with the external face 72 of the braking piston 62 opposite its face 64 according to its internal periphery 68B.

This spring washer elastically stresses the braking piston 62 to move it in a first direction F1, towards its braking position shown in FIG. 1, in which the support zone 66 axially stresses the plates 32 and 54 in braking contact.

When the support zone 66 axially thrusts the plates in the direction F1, a friction force is set up between the radial faces of the interleafed plates 54 and 32, which will, brake relative rotation of the shafts 26 and 20 relative to the housing 2A, 2B, 2C and 2D.

The braking device 60 comprises more hydraulic means for axially moving the braking piston 62 in the direction F2 opposite F1, against the action of the spring washer 68, to guide this piston into an unbraking position in which braking contact is cancelled.

When the thrust of the support zone 66 in the direction F1 on the plates ceases, the plates 32 and 54 can freely turn relative to each other, their friction contact being cancelled.

These hydraulic means comprise an unbraking fluid-supply conduit 74, indicated by dashed lines in FIG. 1 (as illustrated in FIG. 1, it is not in the plane of the figure) and an unbraking chamber 76 arranged to the side of the face 64 of the braking piston, a chamber in which the conduit 74 terminates.

Supplying the chamber 76 with pressurised fluid will stress the piston 62 to move it in the direction 52, unbraking being effective only if the pressure generates a force which is superior or equal to that generated by the spring washer 68.

Consequently, in the case where the user wants a high braking force, the increase in braking force needs a corresponding increase in unbraking pressure, which cannot necessarily be provided by the hydraulic circuit, or which would need considerable overdimensioning.

Also, it is necessary to use elements having substantial dimensions to be able to resist greater unbraking pressure.

The invention aims to propose a braking device for engine vehicles having increased brake torque relative to current solutions, while retaining unbraking pressure and unchanged bulk.

PRESENTATION OF THE INVENTION

The invention aims to respond to these problems, and presents a braking device comprising
- a brake housing mounted in relative rotation relative to a shaft,
- first braking means, solid in rotation with the brake housing,
- second braking means solid in rotation with the shaft, adapted to cooperate with said first braking means,
- a braking piston adapted to stress said first braking means,
- at least one spring washer comprising a first face, a second face, an internal periphery and an external periphery, said spring washer being mounted supported on the brake housing according to a housing support zone located on one of the internal or external peripheries of the first face of said spring washer, said spring washer having on its second face a braking support zone adapted to cooperate with the braking piston so as to stress the first braking means according to a braking direction, said device being characterised in that:

it comprises an unbraking piston adapted to stress the elastic means according to a direction opposite said braking direction, the at least one spring washer has an unbraking support zone with the unbraking piston on the other of the internal or external peripheries of the second face of the spring washer, said braking support zone being located at an intermediate position of the at least one spring washer, between the housing support zone and the unbraking support zone.

According to particular embodiments, the invention has one or more of the following characteristics which can be considered individually or in combination:

the braking support zone is substantially at a third of the distance between the internal periphery and the external periphery of said spring washer;

said first and second braking means comprise a stack of alternating plates;

the device is enclosed by bearings, said bearings able to be conical bearings arranged on either side of said braking device on the shaft and mounted in a back-to-back arrangement;

the first and second braking means and the unbraking piston are mounted concentrically on the axis, the unbraking piston being arranged substantially at the outer periphery of the first and second braking means;

the device comprises a contact stop adapted to cooperate with the spring washer and the first and second braking means, said contact stop being arranged substantially opposite the braking piston.

According to a variant, said brake and unbraking pistons are fed with pressure by distinct pressure-supply conduits, and have distinct pressurising chambers.

According to another variant, said brake and unbraking pistons are fed by the same pressure-supply conduit and have a common pressurising chamber.

The invention also relates to a hydraulic engine fitted with such a braking device.

PRESENTATION OF FIGURES

Other characteristics, aims and advantages of the invention will emerge from the following description, which is purely illustrative and non-limiting, and which must be considered with respect to the attached diagrams, in which:

FIG. 1 has already been described earlier and has a hydraulic engine according to the prior art fitted with a braking device.

Figure 2:
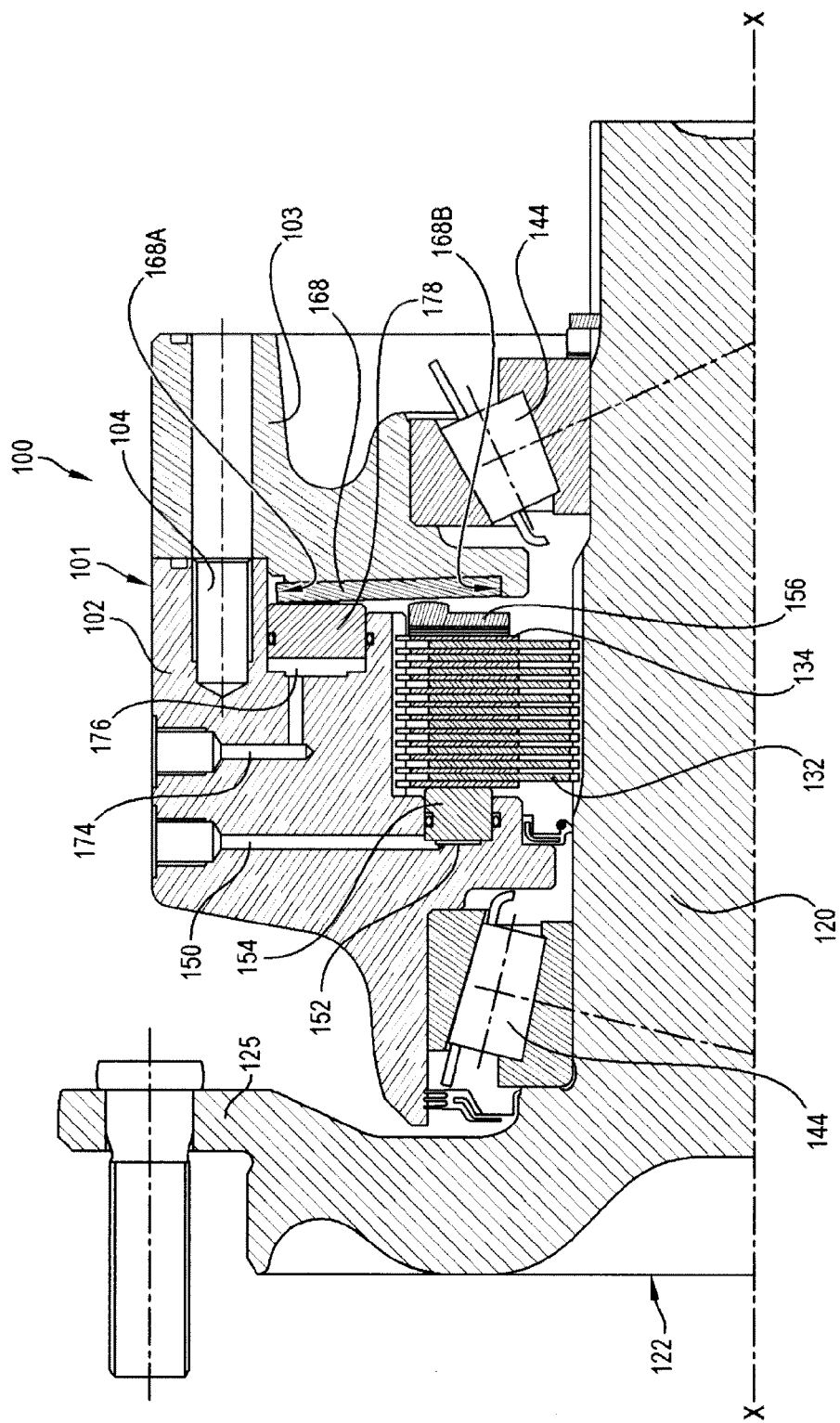
Figure 3:
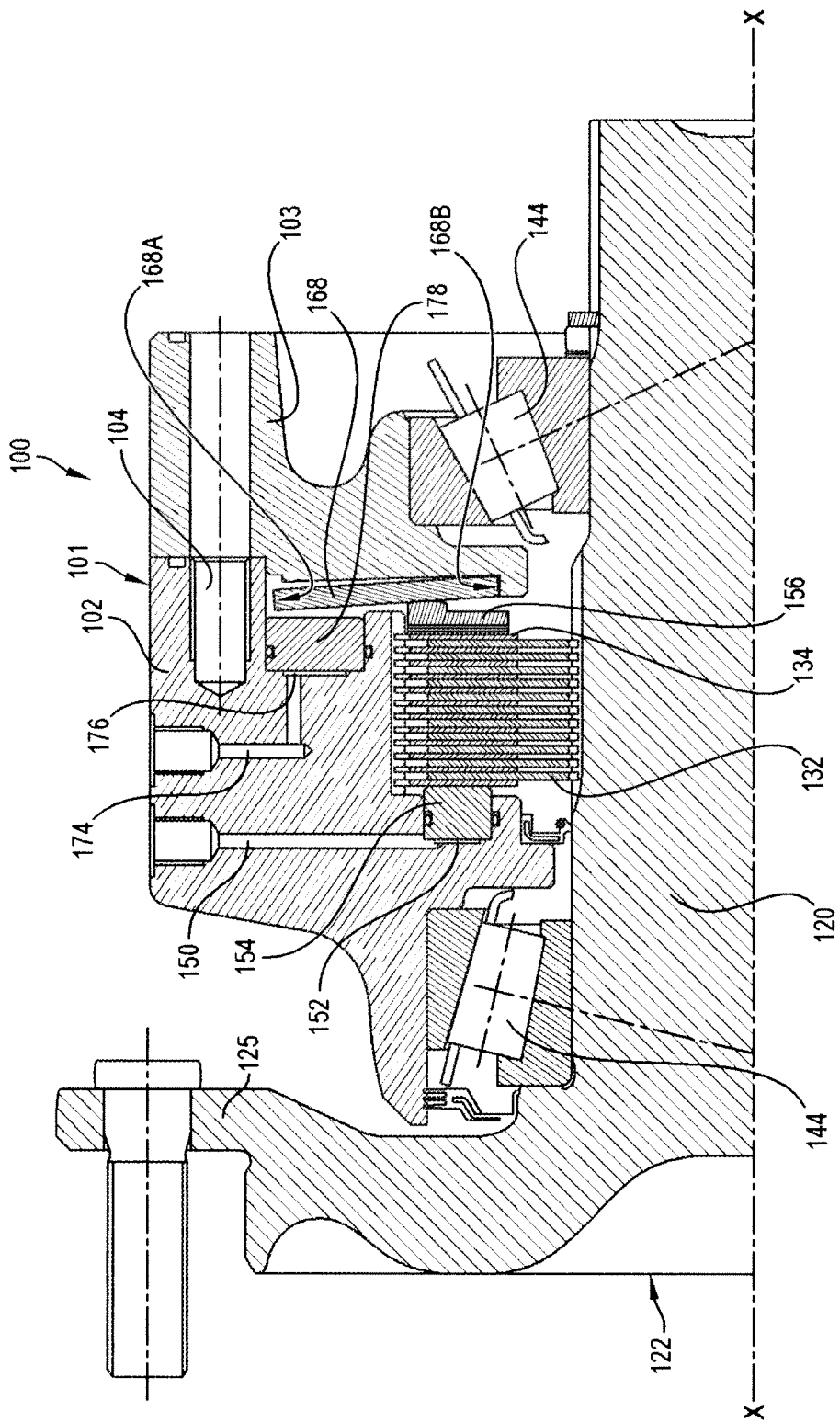
Figure 4:
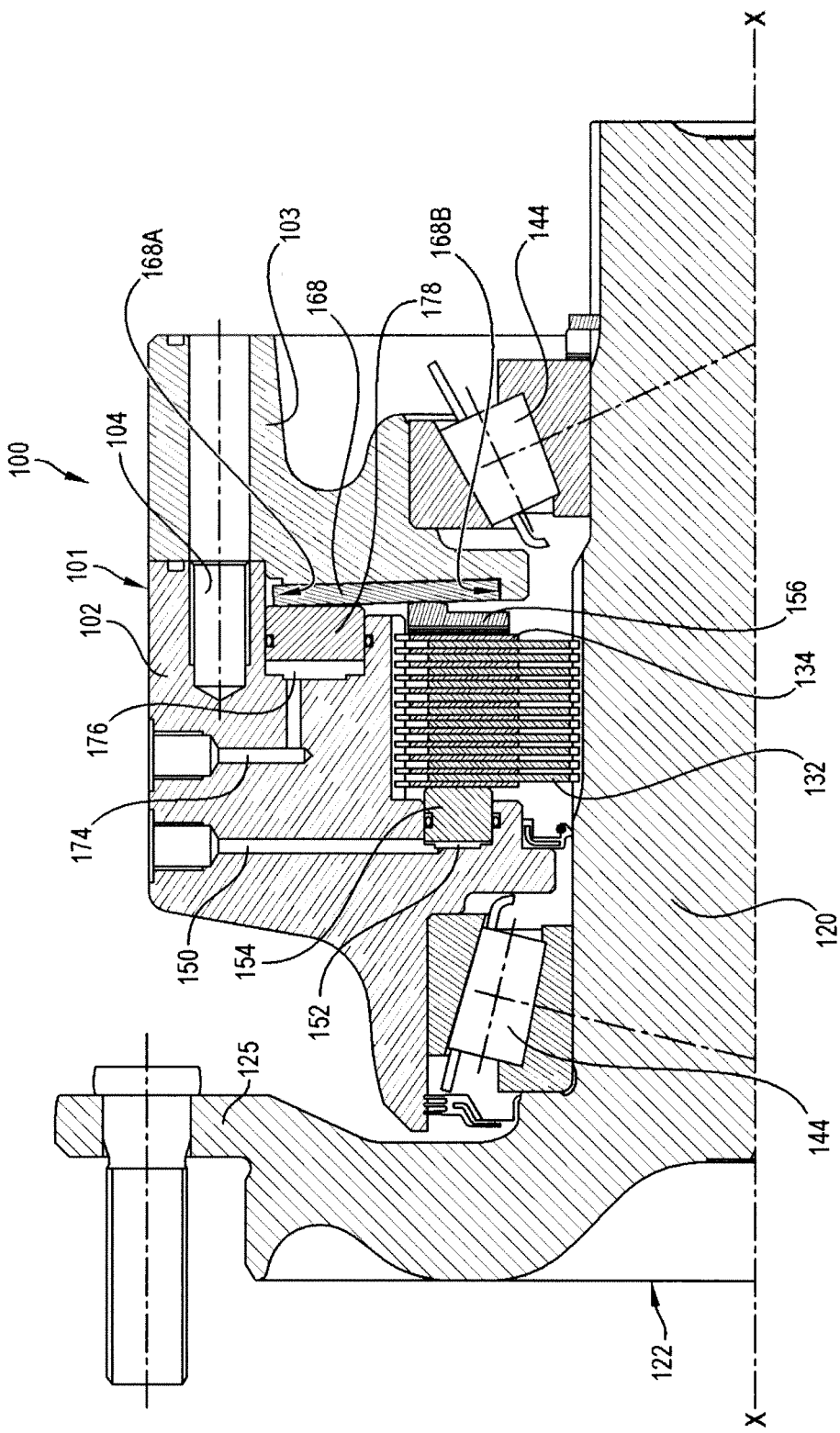

FIGS. 2, 3 and 4 have an improved braking device according to an embodiment of the invention in three distinct configurations.

Figure 5:
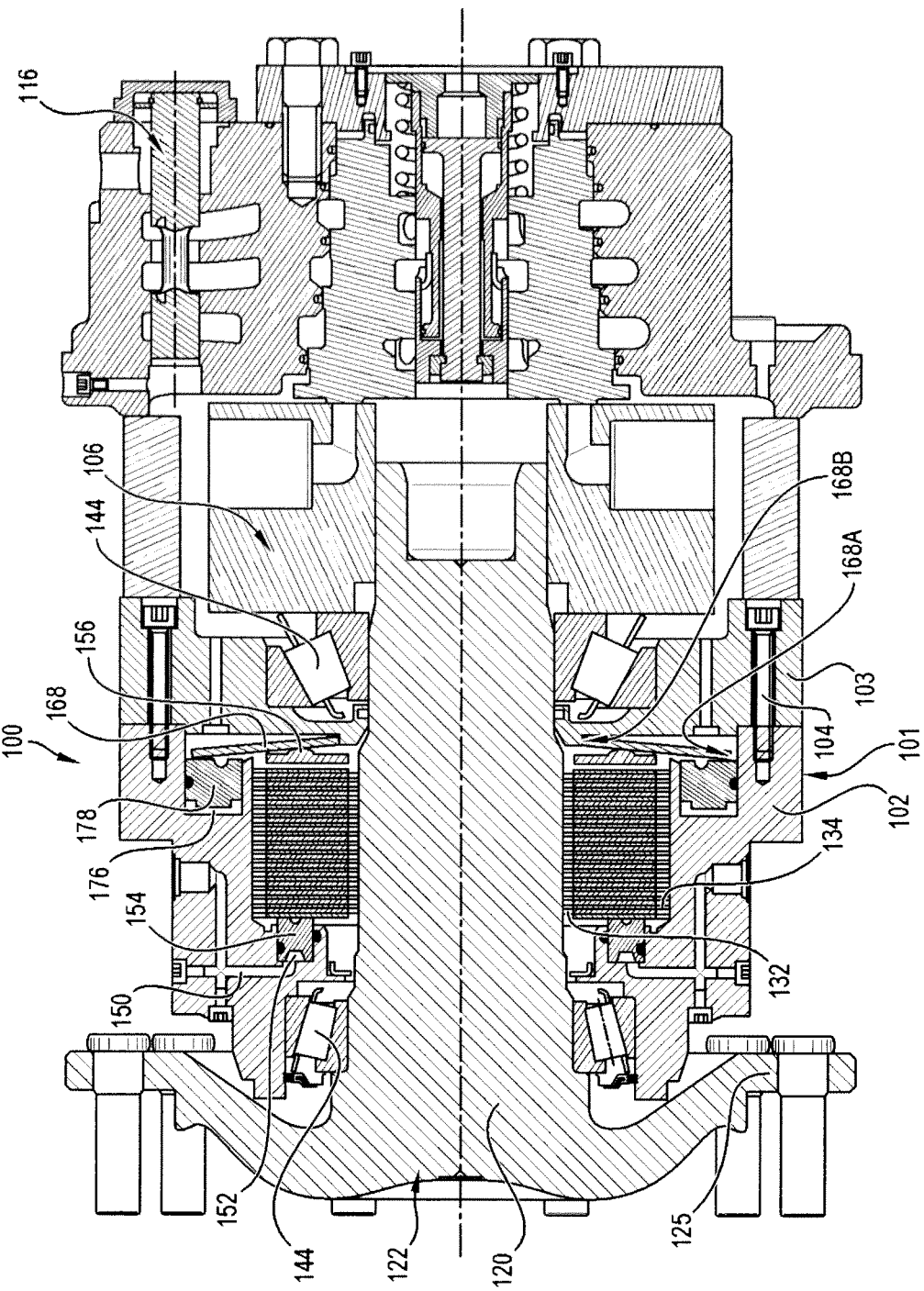

FIG. 5 presents an improved braking device linked to other elements of a hydraulic engine.

Figure 6:
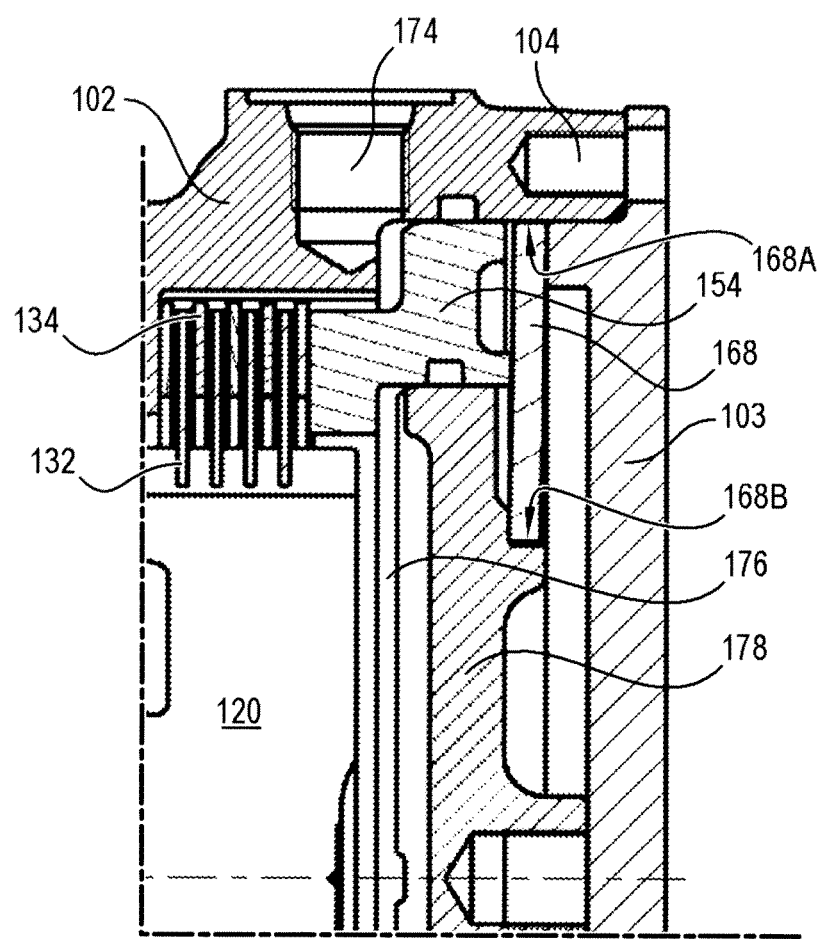
Figure 7:
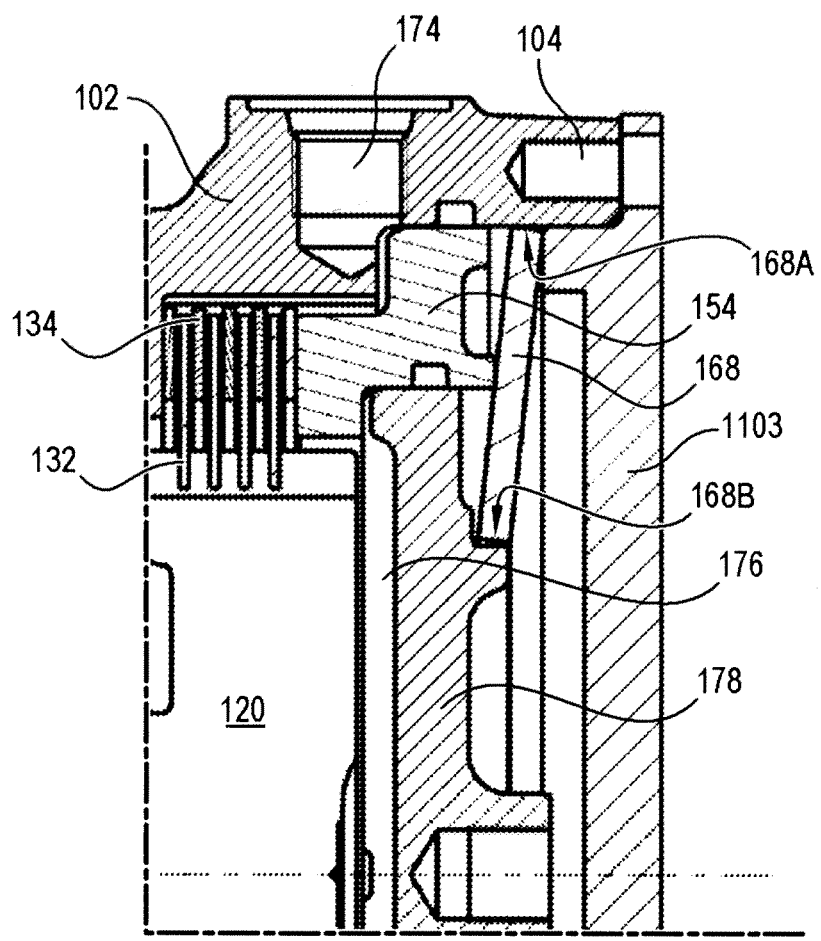

FIGS. 6 and 7 present another embodiment of an improved braking device according to the invention.

DETAILED DESCRIPTION

FIG. 2 presents a partial view of an improved braking device 100 according to the invention applied in particular to hydraulic engines and producing static or dynamic braking.

The improved braking device 100 is mounted on a shaft 120, and comprises:

a brake housing 101 here comprising two parts: an external part 102 and an internal part 103, these two parts 102 and 103 being assembled so as to be fixed relative to each other via linking means 104, first braking means 134 solid in rotation with the brake housing 101, here in the form of annular plates centred on the axis X-X, second braking means 132 solid in rotation with the shaft 120, typically annular plates centred on the axis X-X, the first and second braking means 132 and 134 being arranged to alternate, to create a stack of interleafed plates 132 and 134, elastic means 168, here taking the form of a spring washer 168, a braking feed conduit 150, a braking chamber 152 and a braking piston 154 of annular form centred on the axis X-X, a contact stop 156, an unbraking feed conduit 174, an unbraking chamber 176 and an unbraking piston 178 of annular form centred on the axis X-X.

The shaft 120 is in relative rotation relative to the brake housing 101 about the axis of rotation X-X, by means of a roller bearing here comprising conical roller bearings 144. The free end 122 of this shaft 120 located outside the brake housing comprises a coupling plate 125 for joining to an element which must be driven in rotation by the engine.

The spring washer 168, is typically a Belleville washer. Such a washer has a conical annular form having an internal periphery 168B and an external periphery 168A, and ensures a spring function. In the embodiment illustrated in FIGS. 2 to 4, the spring washer 168 has a form concave towards the stack of plates 132 and 134.

Several differences in structure between the device presented in this figure and the device according to the prior art such as presented in FIG. 1 are noticed, especially in terms of placement of the spring washer 168.

In fact, in the device according to the prior art illustrated in FIG. 1 the spring washer 68 is supported on two elements: the stop ring 70 on one side and the brake piston 62 on the other. It is this brake piston 62 which will cooperate directly with the plates 32 to produce braking or unbraking.

In the improved braking device 100 according to the invention presented in FIG. 2, the spring washer 168 has support zones with three elements:

a housing support zone with the internal part 103 of the brake housing 101 on a first face of the spring washer 168 and according to the internal periphery 168B of the spring washer 168, the internal part 103 of the brake housing 101 typically exhibiting conical machining so that the spring washer 168 is supported satisfactorily in the unbraking position, an unbraking support zone with the unbraking piston 178, on the face of the spring washer 168 opposite the face of the housing support zone, and according to the external periphery 168A of the spring washer 168, a braking support zone with the contact stop 156, on the same face of the washer as the unbraking support zone, at an intermediate position between the internal periphery 168B and the external periphery 168A of the spring washer 168, the intermediate position being at a distance typically less than the mid-distance between said internal periphery 168B and said external periphery 168A of the spring washer 168, preferably of the order of a third of this distance.

The spring washer 168 therefore has three support zones.

According to other embodiments, positioning of the housing support zone and of the unbraking support zone can be reversed, the housing support zone then being according to the external periphery 168A of the spring washer 168, whereas the unbraking support zone is according to the internal periphery 168B of the spring washer 168.

The spring washer 168 and/or the different pieces supported on the spring washer 168 typically have forms adapted to define a given support point, for example a boss on the spring washer 168 or boss on the piece supported on the spring washer 168, typically the unbraking piston 178 or the contact stop 156.

Other variants are possible, for example welding or stapling a ring onto the spring washer 168 or onto an element supported on the spring washer 168.

Positioning of these support zones defines a lever arm different for forces applied to the spring washer 168 by the braking piston 154 and the unbraking piston 178.

In fact, the lever arm of the force applied by the unbraking piston 178 corresponds to the distance separating the internal periphery 168B from the external periphery 168A of the spring washer 168, whereas the lever arm of the force applied at the level of the braking support zone corresponds to the distance separating the internal periphery 168B of the spring washer 168 and the intermediate position of the braking support zone, which is less than the preceding.

Also, the braking device 100 according to a variant of the invention such as illustrated in FIG. 2 comprises the stack of plates 132 and 134 arranged on one hand between the braking piston 154, and on the other hand the contact stop 156.

So, the stack of plates 132 and 134 can be subjected to compression force resulting both from the spring washer 168 and the braking piston 154.

Braking and unbraking are created by varying the compression force exerted on the stack of plates 132 and 134; when the plates 132 and 134 are compressed they generate friction force so as to oppose movement in rotation of the shaft 120. When the plates 134 and 132 are not subjected to compression force the device 100 is then in the unbraking position.

The plates 132 and 134 are compressed made via application of distinct pressures via the braking feed conduit 150 and the unbraking feed conduit 174, so as to apply distinct pressures in the braking 152 and unbraking 176 chambers, these two chambers 152 and 176 being distinct in this embodiment.

As illustrated in FIG. 2, the improved braking device 100 is in the unbraking position.

FIGS. 3 and 4 as such will be detailed hereinbelow, and illustrate this same improved braking device 100 respectively in the static braking and dynamic braking position.

In the unbraking position, no pressure is applied via the braking feed conduit 150, whereas slight pressure is applied via the unbraking conduit, typically of the order of 15 bars.

The unbraking piston 178 is then in contact with the spring washer 168 and exerts force on the latter.

The spring washer 168 is then subjected to flexion force, involving the latter exerting no force on the contact stop 156, and therefore the plates 132 and 134 are not subjected to compression force.

The braking device 100 is therefore in the unbraking position.

In the configuration illustrated in FIG. 3, no pressure is applied via the braking conduit 150 or via the unbraking conduit 174. The unbraking piston 178 no longer applies force to the spring washer 168, which is when the contact stop 156 is in contact with the spring washer 168.

In fact, the spring washer 168 is no longer subjected to flexion force, and so comes into contact with the contact stop 156 in exerting force which will be transmitted to the plates 132 and 134 to compress them.

This therefore produces static braking, ensured by the action of the spring washer 168.

FIG. 4 presents the braking device 100 in the dynamic braking position.

In this configuration, distinct pressures are applied via the braking conduit 150 and via the unbraking conduit 174.

The piston 154 exerts force on the plates 132 and 134 according to the face of the plates opposite the contact stop 156, and which exerts force on the washer 168.

The unbraking piston 178 as such proportionally varies the force exerted by the spring washer 168 on the contact stop 156.

In a particular embodiment, the pressures applied via the braking conduit 150 and via the unbraking conduit 174 are respectively 120 Bars and of 15 Bars.

To return to the unbraking position such as presented in FIG. 2, it suffices to cease applying pressure via the braking conduit 150.

The device will then rock towards the unbraking position in which only the unbraking piston 178 is in contact with the spring washer 168.

This braking device therefore exploits the force generated by the spring washer 168 at a point substantially at mid-distance between its internal periphery 168B and its external periphery 168A, where the force it provides is the greatest for generating braking, and is supported on the end of said spring washer 168 where the force is the weakest for generating unbraking.

According to a first aspect, the braking system presented increases braking torque while retaining unbraking pressure and unchanged bulk.

In fact, in this improved braking device 100 the contact stop 156 has a support zone on the spring washer 168 arranged substantially towards the centre of this spring washer 168.

Yet, in applying force on a zone substantially towards the centre of the spring washer 168 and not at its end, the force delivered by the spring washer 168 is multiplied relative to that delivered by the washer of a braking device according to the prior art, typically by a coefficient of the order of 3.5 for a spring washer 168 having an inner diameter of the order of 120 mm and external diameter of 265 mm.

The compression force transmitted to the plates 132 and 134 is consequently clearly greater relative to the devices according to the prior art, which causes greater braking force.

According to another aspect the braking system such as presented allows for unchanged braking pressure, using a stack of plates comprising fewer plates than in conventional braking systems.

In fact, the fewer the plates 134 and 132, the greater the force necessary to be applied to ensure given braking torque is substantial. But due to the force delivered by the washer which has increased, a lesser number of plates 134 and 132 can be used, typically of the order of 30%, while retaining braking torque of the same order of magnitude.

Also, the braking device such as presented can be slackened by applying weaker pressure relative to the devices according to the prior art.

In fact, for identical braking force, the improved braking device uses a spring washer having a lesser thickness and therefore needing less pressure to be flexed. The gain in pressure is for example of the order of 25%.

FIGS. 2 to 4 also present specific positioning of the braking device 100 which is arranged at the free end 122 of the shaft 120 and is enclosed by the bearings 144 mounted in a back-to-back arrangement. The braking device 100 is arranged in this way in the roller bearing.

More precisely, in this embodiment, the plates 132 and 134 are arranged on the periphery of the shaft 120, enclosed on either sides by the bearings 144. The spring washer 168 is also arranged in the roller bearing, at least partially opposite the plates 132 and 134, such that the contact stop 156 which is arranged in contact with the plates 132 and 134 is also opposite the spring washer 168.

The braking piston 154 as such is arranged in contact with the plates 132 and 134, so as to be substantially aligned with the contact stop 156 to optimise contact on the plates 132 and 134, so as to avoid deforming the pieces.

The unbraking piston 178 is arranged centred on the shaft 120, at a distance from the shaft 120 greater than the distance between the shaft 120 and the plates 132 and 134. Accordingly, the unbraking piston is arranged at the outer periphery of the plates 132 and 134, which is illustrated in the sectional view presented in FIGS. 2 to 4 by superposition of these elements. The plates 132 and 134 are arranged substantially at the centre of the unbraking piston 178.

This particular arrangement of the unbraking piston 178 and plates 132 and 134 permits a gain in terms of bulk in particular in terms of bulk according to the length of the axis 120, and produces a braking device 100 having strong axial compactness.

This positioning of the braking device in the roller bearing releases the internal fluid distributor presented in FIG. 1, which is arranged at the end of the shaft 120 opposite the free end 122.

So, contrary to the hydraulic engine according to the prior art, in which the internal fluid distributor is enclosed on one side by the roller bearing and on the other by the braking device, it is possible to link other elements to the fluid distributor, typically control selectors of cylinder capacity, exchange valves or any other adapted element.

FIG. 5 illustrates a braking device similar to that presented in FIGS. 2 to 4, linked to a cylinder block 106 and a distributor 116.

The elements similar to those presented in FIGS. 2 to 4 are marked by identical references numerals, specifically:
- the shaft 120 having a coupling plate 125,
- the brake housing 101 comprising two parts 102 and 103, assembled via an assembly element 104,
- bearings 144,
- plates 132 and 134 respectively solid in rotation with the shaft 120 and the housing 102,
- a braking piston 154, a braking chamber 152 and a braking feed conduit 150,
- an unbraking piston 178, an unbraking chamber 176, the unbraking feed conduit not being shown here,
- a spring washer 168,
- a contact stop 156.

As is illustrated in FIG. 5, the cylinder block 106 and the distributor 116 are arranged in this order after the braking device 100, at the end of the shaft 120 opposite its free end 122 having the coupling plate 125.

FIGS. 6 and 7 present a detailed view of another embodiment of an improved braking device, to produce static braking. These figures present this embodiment respectively in the unbraking position and in the static braking position.

In this particular embodiment of the invention, the braking device according to the invention is arranged at one end of the shaft 120 in the same way as the braking device presented previously in FIG. 1.

This embodiment comprises elements common to the embodiment presented in FIGS. 2 to 4, but differs therefrom especially in that the brake 154 and unbraking 178 pistons are fed by the same unbraking feed conduit 174, and have a common unbraking chamber 176.

In this embodiment, the spring washer 168 is a conical ring, convex towards the stack of plates 132 and 134. The unbraking piston 178 has a section in the form of a disc centred on the shaft 120, and the braking piston 154 has a form of a ring centred on the shaft 120, extending about said unbraking piston 178.

The stack of plates 132 and 134 is arranged as a stop on the housing 102 on one of its faces, whereas the face opposite the stack of plates 132 and 134 is in contact with the braking piston 154. So, contrary to the embodiment illustrated in FIGS. 2 to 4, compression of the plates 132 and 134 results here only from force applied to a single face.

In the same way as for the embodiment presented in FIGS. 2 to 4, the spring washer 168 has three support zones:
- a housing support zone on the external periphery 168A of a first face of the spring washer 168, at the level of which the spring washer 168 is in contact with a stop arranged on the housing 103, the internal part 103 of the brake housing 101 typically exhibiting conical machining so as to improve the support of the spring washer 168 on the housing 103 in the unbraking position,
- an unbraking support zone on the internal periphery 168B of the face of the spring washer 168 opposite that housing the housing support zone, at the level of which the spring washer 168 is in contact with the unbraking piston 178,
- a braking support zone located on the same face of the washer as the unbraking support zone, at an intermediate position between the internal periphery 168B and the external periphery 168A of the spring washer 168, at the level of which the spring washer 168 is in contact with the braking piston 154.

According to other embodiments, the positioning of the housing support zone and of the unbraking support zone can be reversed, the housing support zone then being according to the internal periphery 168B of the spring washer 168, whereas the unbraking support zone is according to the external periphery 168A of the spring washer 168.

The braking piston 154 is in contact on one side with the plates 134 and 132 and on the other with the spring washer 168.

When there is no pressure applied via the unbraking feed conduit 174, the spring washer 168 exerts force on the braking piston 154 which transmits this force to the plates 134 and 132 to generate static braking as illustrated in FIG. 7. As evident earlier, the support zone of this braking piston 154 located substantially at the centre of the spring washer 168 generates better braking than in the event where the support zone would be located at the periphery of said spring washer 168.

During application of unbraking pressure via the unbraking feed conduit 174 pressure is transmitted to the unbraking chamber then to the two pistons 154 and 178 which will apply flexion force to the spring washer 168 as illustrated in FIG. 6.

Due to the support zones of these two pistons 154 and 178 on the spring washer 168, and of the ratio of the sections of said pistons 154 and 178, it is the unbraking piston 178 which will play a predominant role in flexing the spring washer 168. In fact, this unbraking piston 178 preferably has a section greater than that of the braking piston 154, and due to its support zone on the spring washer 168 at the level of its periphery the force necessary for flexing it is reduced.

The braking piston 154 also exerts flexion force on the spring washer 168, but due to its support zone on the spring washer 168 substantially at its centre and its lesser section its effect on said spring washer 168 will be negligible relative to that of the unbraking piston 178.

This embodiment therefore performs static braking stronger than that in a braking device according to the prior art, at the same time having reduced unbraking pressure of the order of 25% relative to a braking device according to the prior art, typically moving from unbraking pressure of 20 bars to unbraking pressure of the order of 15 bars, the unbraking pressure varying as a function of the dimensioning of the brake.

This particular embodiment can of course be mounted on the shaft similarly to that shown in FIGS. 2 to 4, and specifically can be arranged on the shaft 120 and no longer at its end, and if necessary arranged enclosed on either side by bearings, typically conical roller bearings mounted in a back-to-back arrangement. The sections of the brake 154 and unbraking 178 pistons will then typically be adapted so as to retain a similar ratio between these two sections.

Even though the illustrated embodiments represent just one spring washer, it is understood that the braking device according to the invention can be adapted to various types of stacks of spring washers, especially spring washers mounted in parallel.

The invention claimed is:

1. A braking device comprising
a brake housing (101) mounted in relative rotation relative to a shaft (120),
first braking means (134), solid in rotation with the brake housing (101),
second braking means (132) solid in rotation with the shaft (120), adapted to cooperate with said first braking means (134),
a braking piston (154) adapted to stress said first braking means (134),
at least one spring washer (168) comprising a first face, a second face, an internal periphery (168B) and an external periphery (168A), said spring washer (168) being mounted supported on the brake housing (101) according to a housing support zone located on one of the internal (168B) or external (168A) peripheries of the first face of said spring washer (168), said spring washer (168) having on its second face a braking support zone, adapted to cooperate with the braking piston (154) so as to stress the first braking means (134) according to a braking direction,
wherein said device further comprises:
an unbraking piston (178), adapted to stress the elastic means (168) according to a direction opposite said braking direction,
the at least one spring washer (168) has an unbraking support zone with the unbraking piston (178) on the other of said internal (168B) or external (168A) peripheries of the second face of the spring washer (168), said braking support zone being located at an intermediate position of the at least one spring washer (168), between the housing support zone and the unbraking support zone,
wherein said first and second braking means (132 and 134) as well as the unbraking piston (178) are mounted concentrically on the axis (120), the unbraking piston (178) being arranged substantially at the outer periphery of said first and second braking means (132 and 134).

2. The device as claimed in claim 1, wherein the braking support zone is substantially at a third of the distance between the internal periphery (168B) and the external periphery (168A) of said spring washer (168).

3. The device as claimed in claim 1, wherein said first and second braking means (134, 132) comprise a stack of alternating plates.

4. The device as claimed in claim 1, wherein said device is enclosed on either side by bearings (144).

5. The device as claimed in claim 4, wherein bearings (144) are conical roller bearings arranged on either side of said braking device on the shaft (120) and mounted in a back-to-back arrangement.

6. The device as claimed in claim 1, comprising a contact stop (156) adapted to cooperate with the spring washer (168) and the first and second braking means (132 and 134), said contact stop (156) being arranged substantially opposite said braking piston (154).

7. The device as claimed in claim 1, wherein brake (154) and unbraking (178) pistons are pressure-fed by distinct pressure-supply conduits (150, 174), and have pressurising chambers (152, 176) distinct.

8. The device as claimed in claim 1, wherein brake (154) and unbraking (178) pistons are fed by the same pressure-supply conduit (174) and have a common pressurising chamber (176).

9. A hydraulic engine, comprising a braking device as claimed in claim 1.

* * * * *

UNITED STATES PATENT AND TRADEMARK OFFICE
CERTIFICATE OF CORRECTION

| | | |
|---|---|---|
| PATENT NO. | : 8,662,259 B2 | Page 1 of 1 |
| APPLICATION NO. | : 13/086340 | |
| DATED | : March 4, 2014 | |
| INVENTOR(S) | : Stephane Vidal et al. | |

It is certified that error appears in the above-identified patent and that said Letters Patent is hereby corrected as shown below:

On the Title Page, in Item [56], under Foreign Patent Documents, at line 2, please delete "2467586" and insert --2462586--.

On the Title Page, in Item [56], under Foreign Patent Documents, at line 4, please delete "211746" and insert --2117465--.

Signed and Sealed this
Twenty-fourth Day of June, 2014

Michelle K. Lee
*Deputy Director of the United States Patent and Trademark Office*